(No Model.)
S. C. BROWNELL.
SLEIGH RUNNER.
No. 363,279. Patented May 17, 1887.
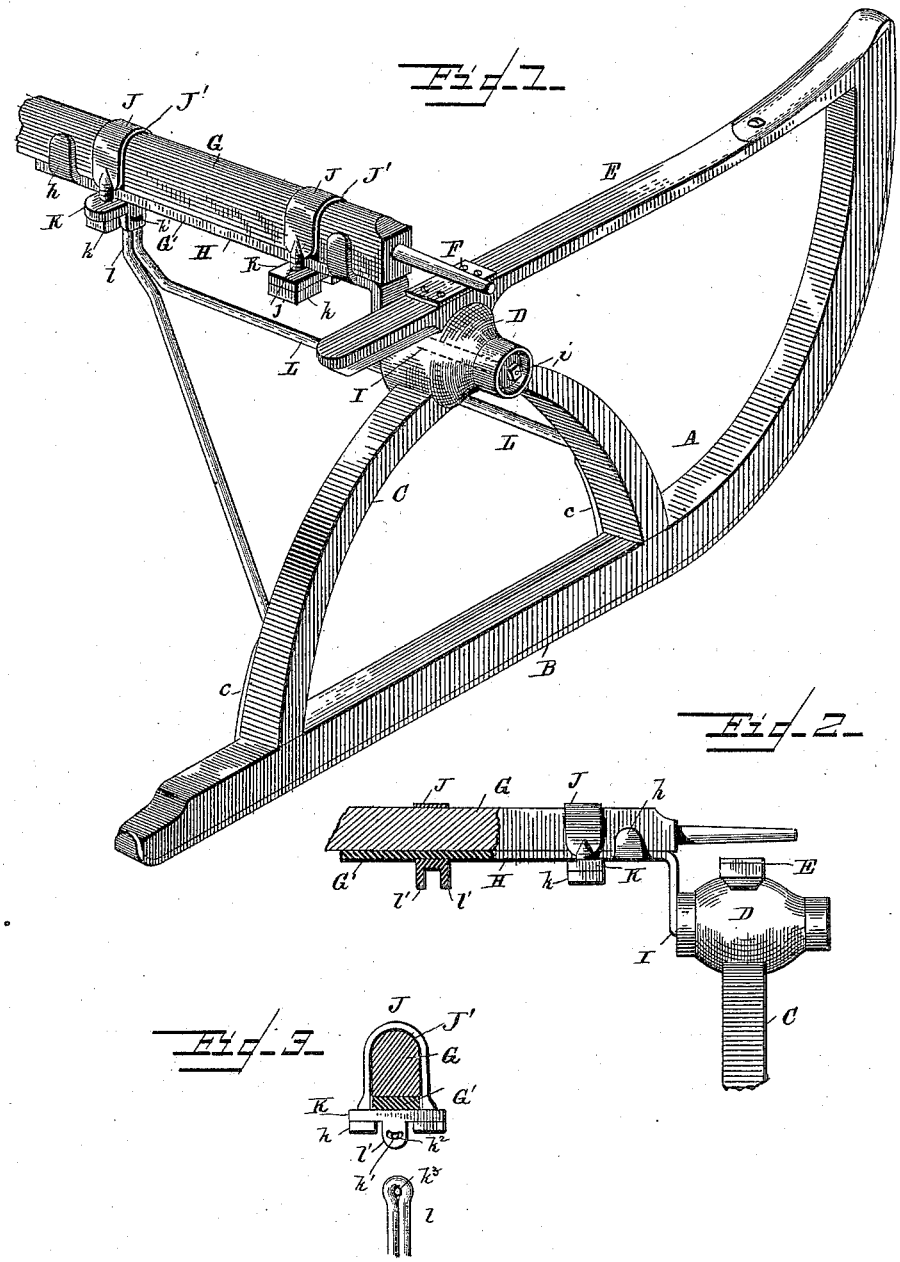

UNITED STATES PATENT OFFICE.

STEPHEN C. BROWNELL, OF LAPEER, MICHIGAN, ASSIGNOR OF ONE-HALF TO GEORGE H. SEELYE AND ALVIRAS W. ANNIS, OF SAME PLACE.

SLEIGH-RUNNER.

SPECIFICATION forming part of Letters Patent No. 363,279, dated May 17, 1887.

Application filed December 9, 1886. Serial No. 221,102. (No model.)

*To all whom it may concern:*

Be it known that I, STEPHEN C. BROWNELL, a citizen of the United States, residing at Lapeer, in the county of Lapeer, State of Michigan, have invented certain new and useful Improvements in Sleigh-runners, of which the following is a specification, reference being had therein to the accompanying drawings.

This invention is an improvement on a patent granted to me on the 5th day of January, 1886, numbered 333,918, and it relates to sleigh-runners so made as to be capable of being attached to and detached from the axles of ordinary wheeled vehicles; and it consists in the parts which will be hereinafter described, and pointed out in the claims.

In the accompanying drawings, Figure 1 represents a perspective view of the sleigh-runner attached to the axle of a vehicle. Fig. 2 is a detailed and partially-sectional view of the same. Fig. 3 represents detail views of the means for securing the runner to the vehicle-axle.

Like letters indicate like parts in the views.

Letter A indicates the runner, preferably made of tough wood. This runner has its front end bent upward in the usual manner, and its under surface shod with metal, B.

C represents an arched knee, having its ends mortised or otherwise strongly secured to the runner.

D is a hub firmly secured to the top of the arched knee C.

E is a rave, having its front end secured to the upwardly-bent front end of the runner and its rear end secured to the top of the hub, preferably by the bolts F, which secure the latter to the arched knee C.

G is the axle of any vehicle, and G' is a supplementary axle for the attachment of the runner. The said axle has a body portion, H, which lies against the under side of the vehicle axle G, and it is provided on its sides with the pairs of upwardly-projecting lugs $h$ $h$, which serve to hold the vehicle-axle in place. At the point where the journal is formed on the vehicle-axle the supplementary or runner axle bends downward at right angles, and then bends horizontally outward to form the round journal I, which has a threaded outer end for the reception of a nut, $i$. This journal is secured in the hub D by means of said nut.

J J are clips or clamping-straps for securing the runner-axle to the vehicle-axle. The said clips embrace the latter axle from above at suitable points, and have their ends $j$ rounded and threaded. These ends pass through openings in the short cross-bars K, which lie transversely against the under sides of the runner-axle G', and are engaged by retaining-nuts $k$ $k$ below the same. The clips J J are rubber-lined on their inside, as indicated by the letter J'. (See Fig. 3.) This rubber lining prevents injury to the axle G.

L is a branch brace, the two outer ends, $e$ $e$, of which are secured, respectively, to the inside of the two outer ends of the arched knee C and runner. The inner portion, $l$, of said branch brace is bent upon itself, so as to form a small loop or opening, $k^3$. Said loop lies between the lugs $l'$ $l'$, which depend from the inner bar K. A bolt, $k'$, passes through curved slots $k^2$ in said lugs and through the loop $k^3$ of the brace-bar L, so as to secure the inner end of the same to the runner-axle. The slots in the lugs are curved, so as to permit of a rocking motion to the inner end of the brace-bar K, and thereby prevent breakage by jar. The runner, arched knee, hub D, and rave E being rigidly united, the hub D being movable on the axle, it follows that the runner and attached parts have a partial rotary and lateral (or rocking) motion, so as to prevent breakage from sudden jars. It also permits the runner to conform to uneven surfaces on the snow. The outer ends of the bar K are flattened or provided with plates, which extend downward on the inner side of the arched knee and runner. These flattened or plate portions are bolted to said knee or runner. By this arrangement a strong union is made between the parts.

It is evident from the foregoing description that the supplementary or runner axles can be very easily and quickly attached to and detached from the vehicle-axle, and when so attached make a strong and safe union therewith. The runner-axle G' can also have the runners quickly and readily detached therefrom when necessary or desirable. The runners are braced laterally on their axles and on the vehicle-axles by the bar L, which forms a very strong support therefor.

Having thus described my invention, what I claim as new, and desire to secure by Letters Patent, is—

1. An improvement in sleigh-runners, consisting in the combination, with a short bar or supplementary axle provided with a downward extension and outward journal projection, of an arched knee provided with a hub on its upper side, and a sleigh-runner secured to the lower ends of said arched knee, substantially as specified.

2. An improvement in sleigh-runners, consisting of a short bar or supplementary axle provided with a downward projection and outward journal extension, an arched knee provided with a hub on its upper side and a sleigh-runner secured to the lower ends of said arched knee, in combination with a vehicle-axle, rubber-lined clips, and means, substantially as described, for securing the vehicle-axle to the supplementary axle.

3. An improvement in sleigh-runners, consisting in the combination, with a short bar or supplementary axle provided on its outer end with a journal, of a sleigh-runner having a hub suitably mounted thereon, a vehicle-axle secured to the supplementary axle, and brace-bars interposed between the runners and axles, said bars being rigidly secured to the runners and movably secured to said axles, whereby the runner and connected parts may rock, substantially as described, and for the purposes set forth.

4. The combination, with the sleigh-runner, the arched knee secured thereto, and the hub secured to the top of said arched knee, of the supplementary or runner axle detachable secured to the axle of a wheeled vehicle, said runner-axle being provided on its outer end with a journal having a bearing in the hub aforesaid, substantially as specified.

5. The combination, with the runner A and the arched knee C, secured thereto, the hub secured to the top of said arched knee, and the rave E, connecting the hub with the front end of the runner, of the supplementary or runner axle secured to the vehicle-axle G, said runner-axle being provided on its outer end with a journal having a bearing in the hub, substantially as specified.

6. The combination, with the sleigh-runner, the arched knee secured to and bracing the same, and the hub secured to the top of said arched knee, of the runner-axle having its inner portion secured to the under side of a vehicle-axle and its journal end I, rounded and threaded and passing centrally through the hub, and the retaining-nut $i$ on the threaded end of the journal I, substantially as specified.

7. The combination, with the sleigh-runner, the arched knee secured thereto, and the hub secured to the arched knee, of the supplementary or runner axle having the lugs $h$, journal I, passing through the hub, the clips J, provided with rounded threaded ends, the clamp-bars K, and retaining-nuts $k$, substantially as specified.

8. The combination, with the runners, the arched knees secured thereto and provided with a hub, of the vehicle-axle G, runner-axle G', provided with journal I and lugs $h$, the clips J, the clamp-bars K, nuts $k$, brace-bar L, having its outer ends secured to the inner surfaces of the arched knees and its inner portion bent to form a loop, the lugs $l'$ $l'$, depending from the inner bar K, said lugs being provided with curved openings $k^2$, and the bolt $k'$, all constructed and arranged substantially as described, and for the purposes set forth.

In testimony whereof I affix my signature in presence of two witnesses.

STEPHEN C. BROWNELL.

Witnesses:
   E. C. ORSBORN,
   ERNEST J. COLLINS.